United States Patent
Hendi et al.

(10) Patent No.: US 10,834,168 B2
(45) Date of Patent: *Nov. 10, 2020

(54) METHODS AND SYSTEMS FOR SECURED REMOTE BROWSING FROM A TRANSPORTATION VEHICLE

(71) Applicant: Panasonic Avionics Corporation, Lake Forest, CA (US)

(72) Inventors: Sarvamangala Hendi, Anaheim, CA (US); Philip Watson, Lake Forest, CA (US); Paul Margis, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,940

(22) Filed: Dec. 16, 2019

(65) Prior Publication Data

US 2020/0145474 A1    May 7, 2020

Related U.S. Application Data (63) Continuation of application No. 15/159,632, filed on May 19, 2016, now Pat. No. 10,554,722.

(51) Int. Cl.
*H04L 29/08* (2006.01)
*H04L 29/06* (2006.01)
(Continued)

(52) U.S. Cl.
CPC .............. *H04L 67/02* (2013.01); *G06F 16/00* (2019.01); *G06F 16/9574* (2019.01);
(Continued)

(58) Field of Classification Search
CPC . H04L 63/1441; H04L 65/4084; H04L 67/02; H04L 67/2861; H04L 67/08;
(Continued)

(56) References Cited

U.S. PATENT DOCUMENTS

| 6,131,119 A | 10/2000 | Fukui |
| 6,148,253 A | 11/2000 | Taguchi et al. |

(Continued)

FOREIGN PATENT DOCUMENTS

| WO | WO2001/059606 | 8/2001 |
| WO | WO2013/079113 | 6/2013 |

OTHER PUBLICATIONS

Office Action from USPTO dated Jan. 26, 2018 for related U.S. Appl. No. 15/159,632.

(Continued)

*Primary Examiner* — Patrice L Winder
*Assistant Examiner* — Angela M Widhalm De Rodrig
(74) *Attorney, Agent, or Firm* — Klein, O'Neill & Singh, LLP

(57) ABSTRACT

Methods and systems for a transportation vehicle are provided. For example, one method includes providing a seat identifier and/or a transportation vehicle identifier in a request to access a webpage via an Internet connection from a seatback device of a transportation vehicle; selecting a server that is not located on the transportation vehicle for providing content to the seatback device; executing a remote browser at the server for retrieving content from the Internet for the seatback device, without having to execute a browser at the seatback device; and rendering content at the seatback device as an image of the content retrieved by the remote browser.

20 Claims, 9 Drawing Sheets

(51) Int. Cl.
  *G06F 21/44* (2013.01)
  *G06F 16/957* (2019.01)
  *G06F 16/00* (2019.01)
  *H04W 4/42* (2018.01)

(52) U.S. Cl.
  CPC .......... *G06F 21/44* (2013.01); *H04L 63/1441* (2013.01); *H04L 65/4084* (2013.01); *H04L 67/04* (2013.01); *H04L 67/08* (2013.01); *H04L 67/2861* (2013.01); *H04L 67/322* (2013.01); *H04L 67/42* (2013.01); *H04L 67/12* (2013.01); *H04W 4/42* (2018.02)

(58) Field of Classification Search
  CPC ....... H04L 67/04; H04L 67/322; H04L 67/42; H04L 67/12; G06F 21/44; G06F 16/9574; G06F 16/00; H04W 4/42
  See application file for complete search history.

(56) References Cited

U.S. PATENT DOCUMENTS

| | | | |
|---|---|---|---|
| 6,453,259 | B1 | 9/2002 | Infiesto |
| 6,810,527 | B1 | 10/2004 | Conrad et al. |
| 7,039,708 | B1 | 5/2006 | Knobl et al. |
| 7,114,171 | B2 | 9/2006 | Brady, Jr. et al. |
| 7,349,361 | B1 | 3/2008 | Allaway et al. |
| 8,489,276 | B2 | 7/2013 | Callahan et al. |
| 8,533,287 | B2 | 9/2013 | Herrero et al. |
| 8,970,647 | B2 | 3/2015 | Alsina et al. |
| 9,043,467 | B2 | 5/2015 | Kovvali et al. |
| 9,904,964 | B1 | 2/2018 | O'Neil-Dunne et al. |
| 10,554,722 | B2 * | 2/2020 | Hendi .................... H04L 67/42 |
| 2001/0051876 | A1 | 12/2001 | Seigel et al. |
| 2005/0154636 | A1 | 7/2005 | Hildinger et al. |
| 2006/0128431 | A1 | 6/2006 | Waugh et al. |
| 2006/0242021 | A1 | 10/2006 | Pavelle et al. |
| 2011/0055314 | A1 | 3/2011 | Rosenstein et al. |
| 2012/0072979 | A1 | 3/2012 | Cha et al. |
| 2012/0284757 | A1 | 11/2012 | Rajapakse |
| 2014/0089017 | A1 | 3/2014 | Klappert et al. |
| 2015/0088760 | A1 | 3/2015 | Meurs |
| 2016/0117268 | A1 | 4/2016 | Griffin |
| 2016/0127895 | A1 | 5/2016 | Bangole et al. |
| 2016/0285542 | A1 | 9/2016 | Du |
| 2017/0072850 | A1 | 3/2017 | Curtis et al. |

OTHER PUBLICATIONS

Final Office Action from USPTO dated Jul. 27, 2018 for related U.S. Appl. No. 15/159,632.

Office Action from USPTO dated May 28, 2019 for related U.S. Appl. No. 15/159,632.

Notice of Allowance from USPTO dated Dec. 5, 2019 for related U.S. Appl. No. 15/159,632.

* cited by examiner

FIG. 5

METHODS AND SYSTEMS FOR SECURED REMOTE BROWSING FROM A TRANSPORTATION VEHICLE

CROSS-REFERENCE TO RELATED APPLICATION

This application is a continuation of U.S. patent application Ser. No. 15/159,632, entitled "METHODS AND SYSTEMS FOR SECURED REMOTE BROWSING FROM A TRANSPORTATION VEHICLE", filed on May 19, 2016, now U.S. Pat. No. 10,554,722, the disclosure of which is incorporated herein by reference in its entirety.

BACKGROUND

Technical Field

The present disclosure relates to secure remote browsing from a transportation vehicle.

Background

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today strive to provide convenient Internet access to users, for example, from a seatback device of an aircraft. This may involve using a browser application with other applications/code, for example, Java, Adobe Flash, Javascript, CSS/HTML engines and other types of applications/code (without derogation of any third party trademark rights). This poses a security risk because a hacker could potentially access an inflight entertainment (IFE) system by injecting malicious code for example, via Javascript or Java. Continuous efforts are being to provide Internet access to users without compromising the security of a transportation vehicle's software and hardware systems.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, a secured, remote browsing system is provided for a transportation vehicle. The examples below are based on an aircraft, but may be implemented on other vehicles, like trains, buses, boats and others. An airline passenger is provided with a seatback device with a display on an aircraft having a processor and a memory. To access a webpage, as described below in detail, a remote browser is executed at a remote device/server that is not located at the transportation vehicle, for example, at a ground server. The ground server retrieves the requested content and a secure image of the content is rendered at the seatback device. Because the browser is executed at the ground server, it reduces the risk of a security breach of an inflight entertainment system (IFE). Also, the process for upgrading the browser at the ground server is more efficient compared to updating the browser at each seat location for different aircrafts operated by different airlines.

In one aspect, a user input is received by a seatback device to access the Internet. The request is sent to the ground server that executes the remote browser. The browser runs in the remote mode while supporting various input methods from different devices besides a touch screen. The system communicates seat location and airline information from the passenger seat to the ground server so that browsing can be managed for any security breach.

In one aspect, methods and systems for a transportation vehicle are provided. For example, one method includes providing a seat identifier and a transportation vehicle identifier in a request to access a webpage via an Internet connection from a seatback device of a transportation vehicle; selecting a server that is not located at the transportation vehicle for providing content to the seatback device; initiating a session for the seatback device after accepting login credentials received from the seatback device; executing a remote browser at the server for retrieving content from the Internet for the seatback device, without having to execute a browser at the seatback device; and rendering content at the seatback device as an image of the content retrieved by the remote browser.

Figure 1A:
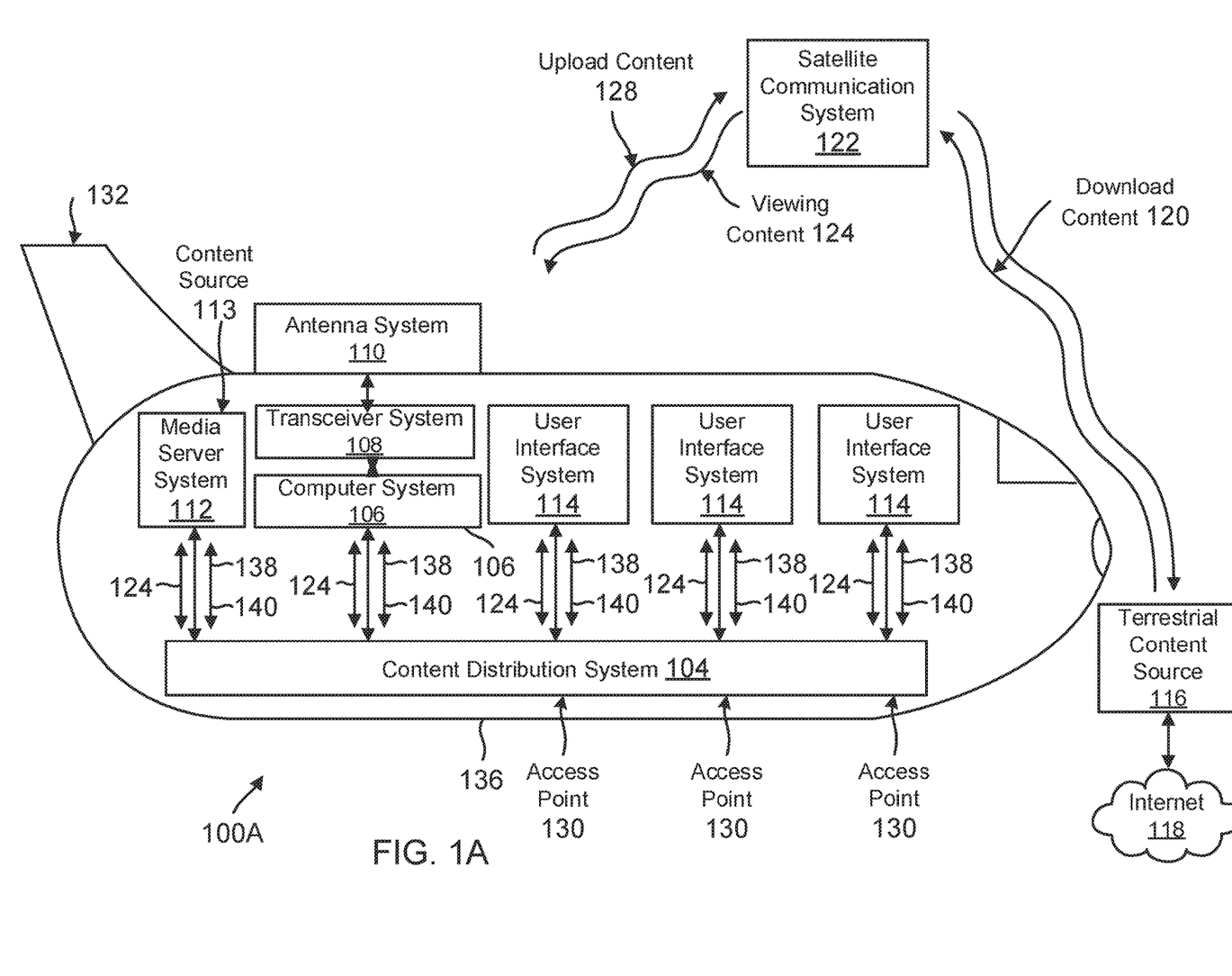
FIG. 1A shows an example of an operating environment for implementing the various aspects of the present disclosure in an aircraft.

Vehicle Information System: FIG. 1A shows an example of a generic vehicle information system 100A (also referred to as system 100A) that can be configured for installation aboard an aircraft 132 for enabling remote browsing, according to one aspect of the present disclosure. When installed on an aircraft, system 100A can comprise a conventional aircraft passenger IFE system, such as the Series 2000, 3000, eFX, eX2, eXW, and/or any other in-flight entertainment system developed and provided by Panasonic Avionics Corporation (without derogation of any trademark rights of Panasonic Avionics Corporation) of Lake Forest, Calif.

System 100A comprises at least one conventional content source 113 and one or more user (or passenger) interface systems (may also be referred to as a setback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or downloaded viewing content 120, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications described below in detail.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive (download) viewing content 120 from a selected terrestrial content source 116 and/or transmit (upload) viewing content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118, described below in detail. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system (also referred to as a seatback device) 114 comprises a software application that a user downloads and installs on a personal user device carried aboard by a user (a personal electronic device or "PED") to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, payment information likewise can be entered via the input system. The input system can be provided in any conventional manner and typically includes one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements.

Figure 1B:
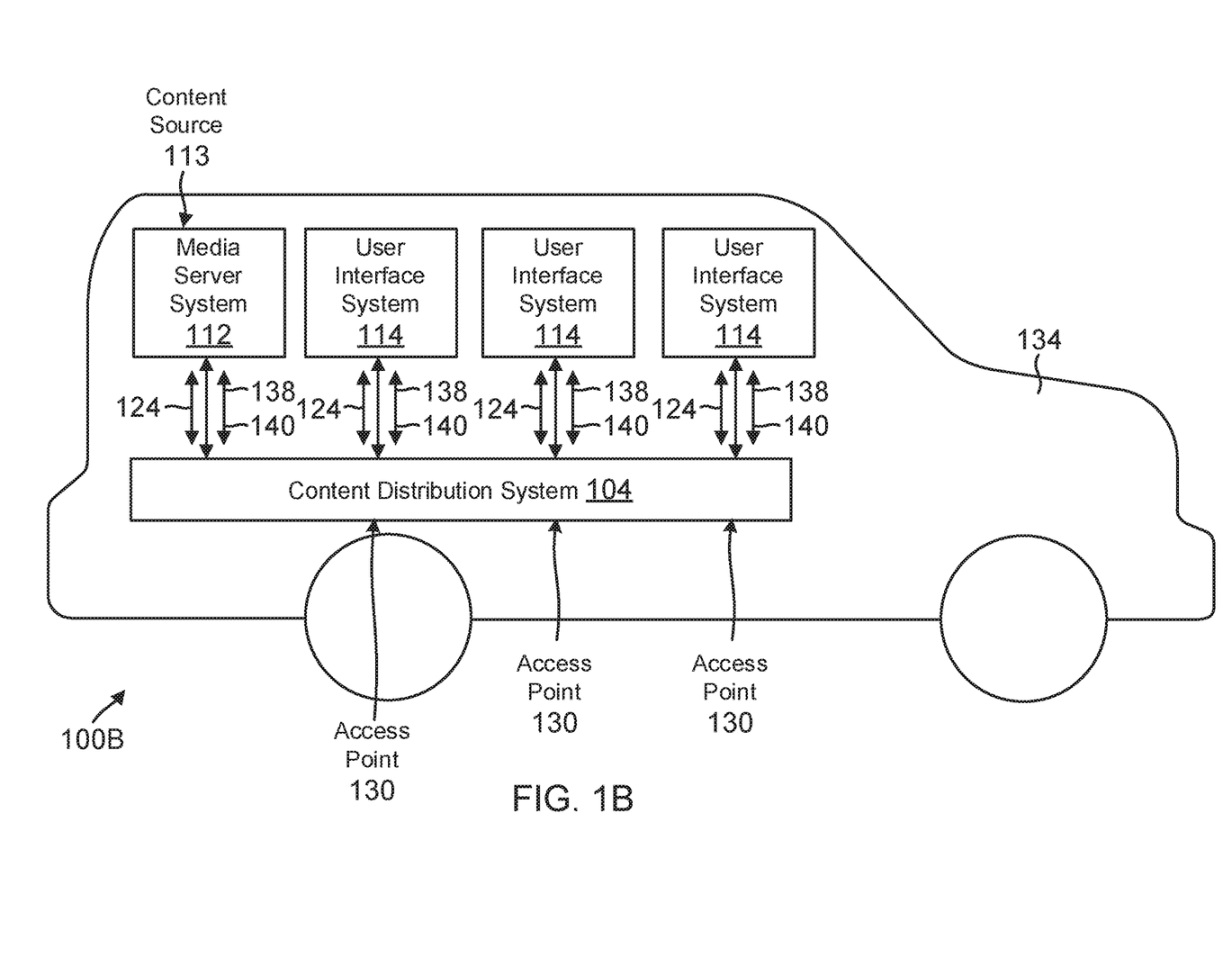
FIG. 1B shows an example of the operating environment at another vehicle, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
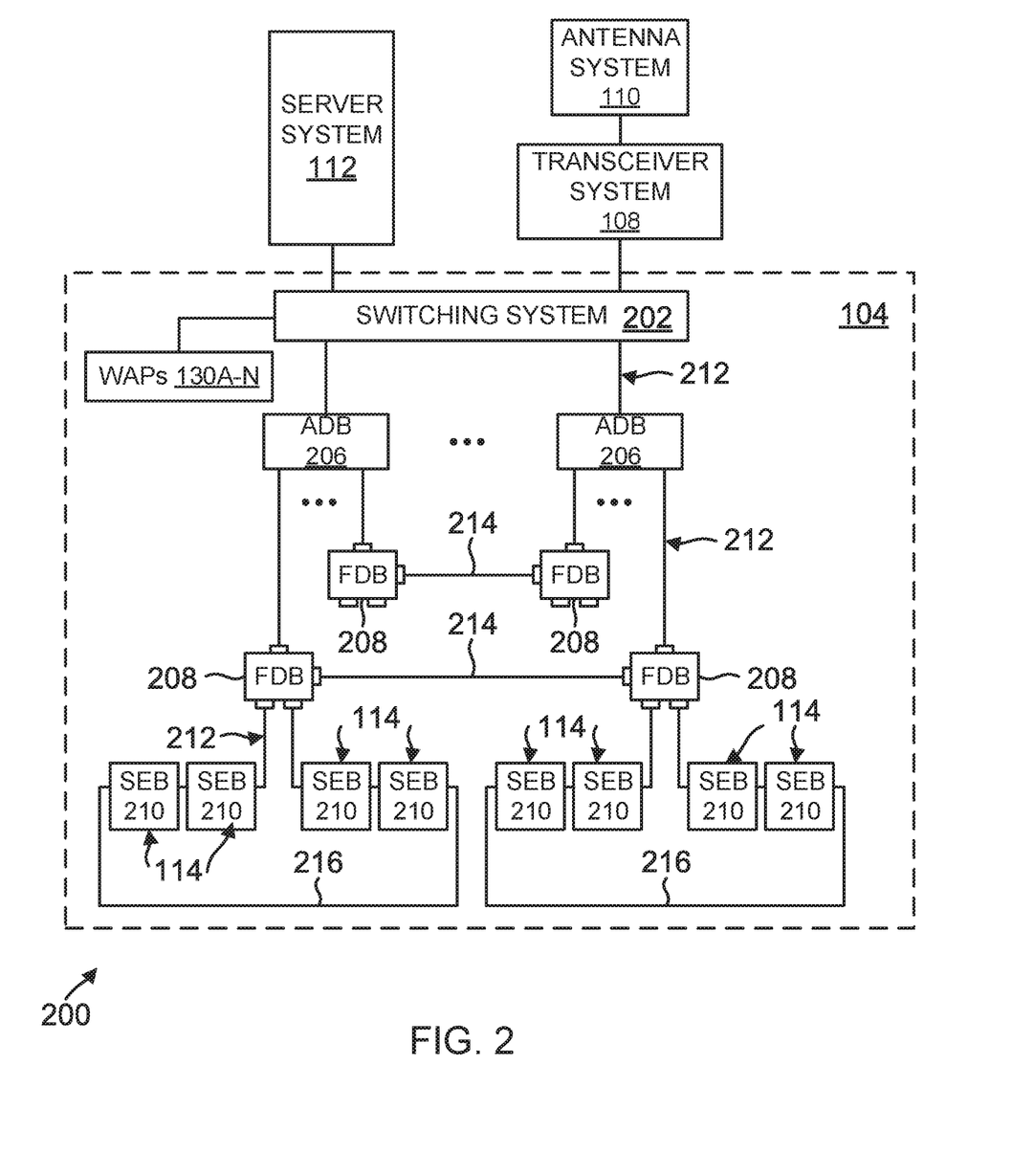
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

Figure 3:
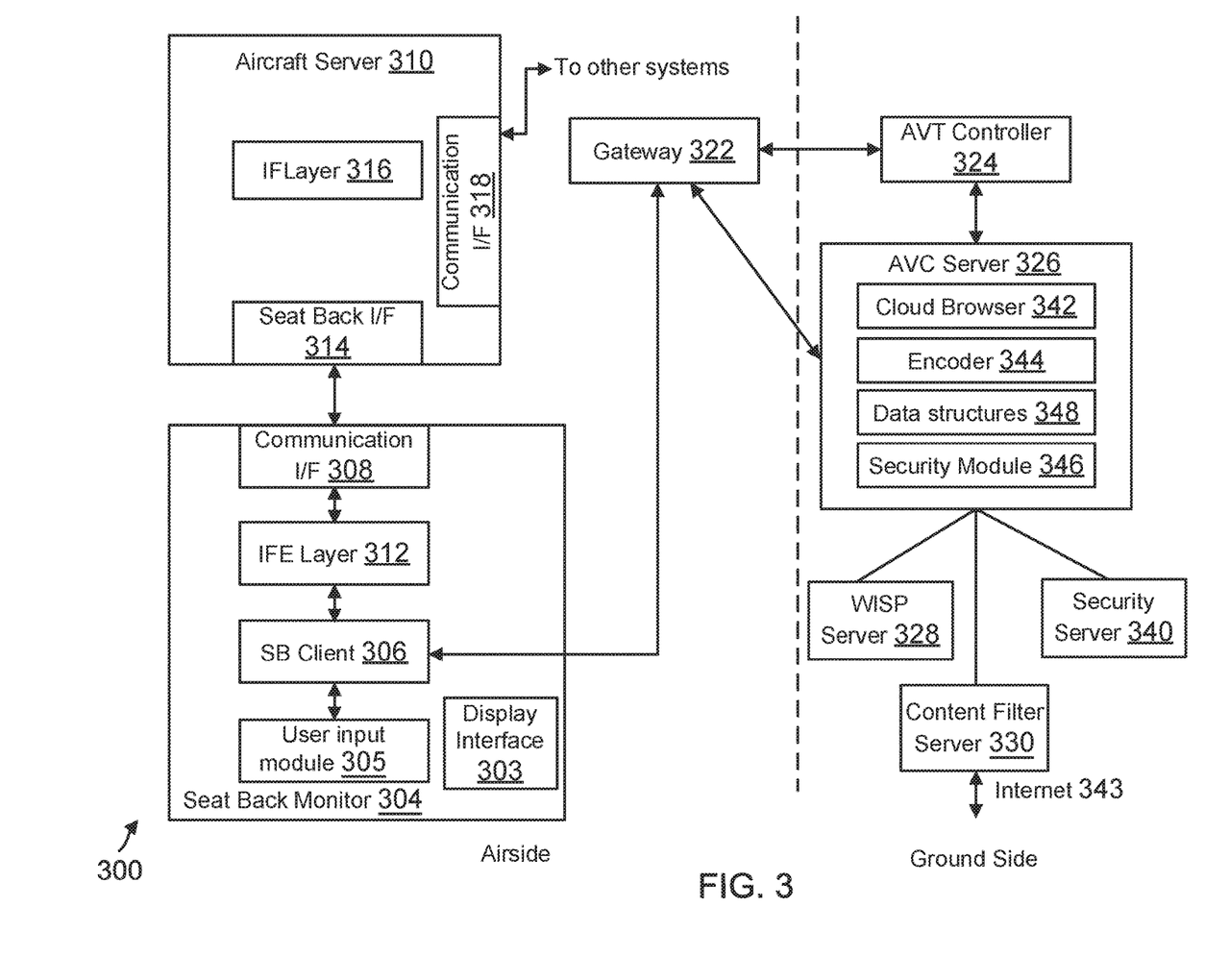
FIG. 3 shows an example of a system for providing remote and secured browsing at a transportation vehicle, according to one aspect of the present disclosure.

Remote Browsing System:

FIG. 3 shows an example of a remote browsing system 300 that is integrated with a vehicle information system of FIGS. 1A/1B, described above. System 300 includes a seatback device 304 that may be part of the user interface system 114 or interfaces with the user interface system (the seatback device 304 need not be mounted on the back of a seat and may be supported from other structures, such a bulkhead, wall, or arm of a seat). The seatback device 304 at least includes a display device that interfaces with a display device interface 303, a processor, memory, a network interface card and local storage. The seatback device 304 includes a user input module 305 that receives user input/requests to initiate a browsing session. For greater security the browsing session always runs in remote mode as described below for accessing the Internet, rather than supporting a typical local browsing mode. The input module 305 maybe configured to use a local touch screen, a local virtual keyboard, an external mouse, external keyboard or any other input device. The various adaptive aspects described herein are not limited to any specific input device.

The seatback device 304 executes a seatback client layer (may also be referred to as a "SBClient") 306 that interfaces with an IFE layer 312. The IFE layer 312 uses a communication interface 308 to interface with an aircraft server 310. The aircraft server 310 includes a seatback interface 314 to communicate with the IFE layer 312 and a communication interface 318 to communicate with other aircraft systems. The seatback interface 314 and the communication interface 318 include logic and circuitry to communicate with seatback device 304 and the other systems, respectively. As an example, aircraft server 310 may be the computer 106 and/or media server system 112.

In one aspect, the SBClient 306 is a screen sharing application. The SBClient 306 generates scroll bars, address with a secure indicator, home icon, back/forward icon and close buttons. In another aspect, the SBClient 306 may also include a button to adjust bandwidth. The SBClient 306 may be configured to process pause, resume and exit commands that are specific to the IFE system, as described below in more detail.

In one aspect, the SBClient 306 also communicates with a gateway server (shown as and referred to as a "gateway") 322 that assists in enabling Internet access to the seatback device 304. The gateway 322 may be a standalone server or integrated with another device/system of the aircraft. The various aspects disclosed herein are not limited to any specific gateway type or gateway configuration.

In one aspect, the aircraft server 310 executes an interface layer (IFLayer) 316 that provides information to the IFE layer 312 described below in more detail.

As an example, in response to a user request for Internet access, the gateway server 322 communicates with an AV traffic controller (shown as and may be referred to as a "traffic controller" or an "AVTController") 324 (AV is used herein as an abbreviation for avionics). The AVTController 324 manages a set of access addresses (for example, Internet Protocol (IP) addresses) for different airlines. The AVTController 324 may maintain one or more data structures (not shown) for managing the various IP addresses. Based on an airline identifier (ID), the AVTController 324 selects a cloud server 326 (also shown as and referred to as an "AVCServer") for enabling Internet access. The AVCServer 326 interfaces with the AVTController 324 and gateway 322 for providing encoded rendered images of web content.

The AVCServer 322 executes a remote browser (shown as and referred to as a "cloud browser") 342 that renders an image of a filtered webpage for a user request for Internet based content. Content maybe filtered using a content filter server 330 that is connected to the Internet 343 (or 118, FIG. 1A). An encoder 344 encodes webpage images before they are securely sent to the SBClient 306. The encoder 344 may use standard encryption techniques to encode the content. The encoded content is provided to the SBClient 306 that decodes the content before it is rendered at a display device.

In one aspect, the AVCServer 326 also tracks bandwidth usage by maintaining the data structure 348. The data structure 348 includes a time stamp for each session, an airline identifier, aircraft tail number that uniquely identifies an aircraft, a seat number, seat IP address, aircraft IP address, the seatback device type, the SBClient version number, duration of a session, uplink bandwidth used, downlink bandwidth used, keystrokes for the session and the number of mouse moves for the session. The bandwidth information may be used by the remote browser 342 to adjust content streaming based on satellite bandwidth availability. In one aspect, the remote cloud browser 342 reduces image resolution or a streaming rate when bandwidth availability is limited. Further, the remote cloud browser 342 is optimized for use as an interactive browser, rather than for displaying/streaming video.

In another aspect, the remote cloud browser 342 blocks popups and malicious content to reduce traffic and make optimum use of a limited bandwidth environment.

A WISP server (shown as and also referred to as a "WISP") 328 enables Internet connectivity for a seatback device as well as lawful intercept, as described below in more detail.

In one aspect, a security module 346 at the AVCServer 326 receives requests for lawful intercepts. A security server 340 lawfully intercepts Internet traffic for security reasons, described below in more detail with respect to FIG. 4D.

In one aspect, the SBClient 306 upon initialization requests a WISP blob, airline identifier (ID), aircraft tail number and the seat number/seatback device IP address (shown as SMIP) from the IFE layer 312. The IFE layer 312 maintains this information in a data structure (not shown) in a storage device either at the seatback device 304 or a remote location, for example, in an aircraft server 310. The information is sent to the AVTController 324 that selects the AVCServer 326 to setup a WISP session and a browser session. Each seatback session has a unique IP address and can be traced to a specific airline ID, aircraft using the tail number and a passenger (i.e., a seat).

The detailed functionality of the various components of system 300 are described below with respect to the process flows of FIGS. 4A-4D.

Figure 4A:
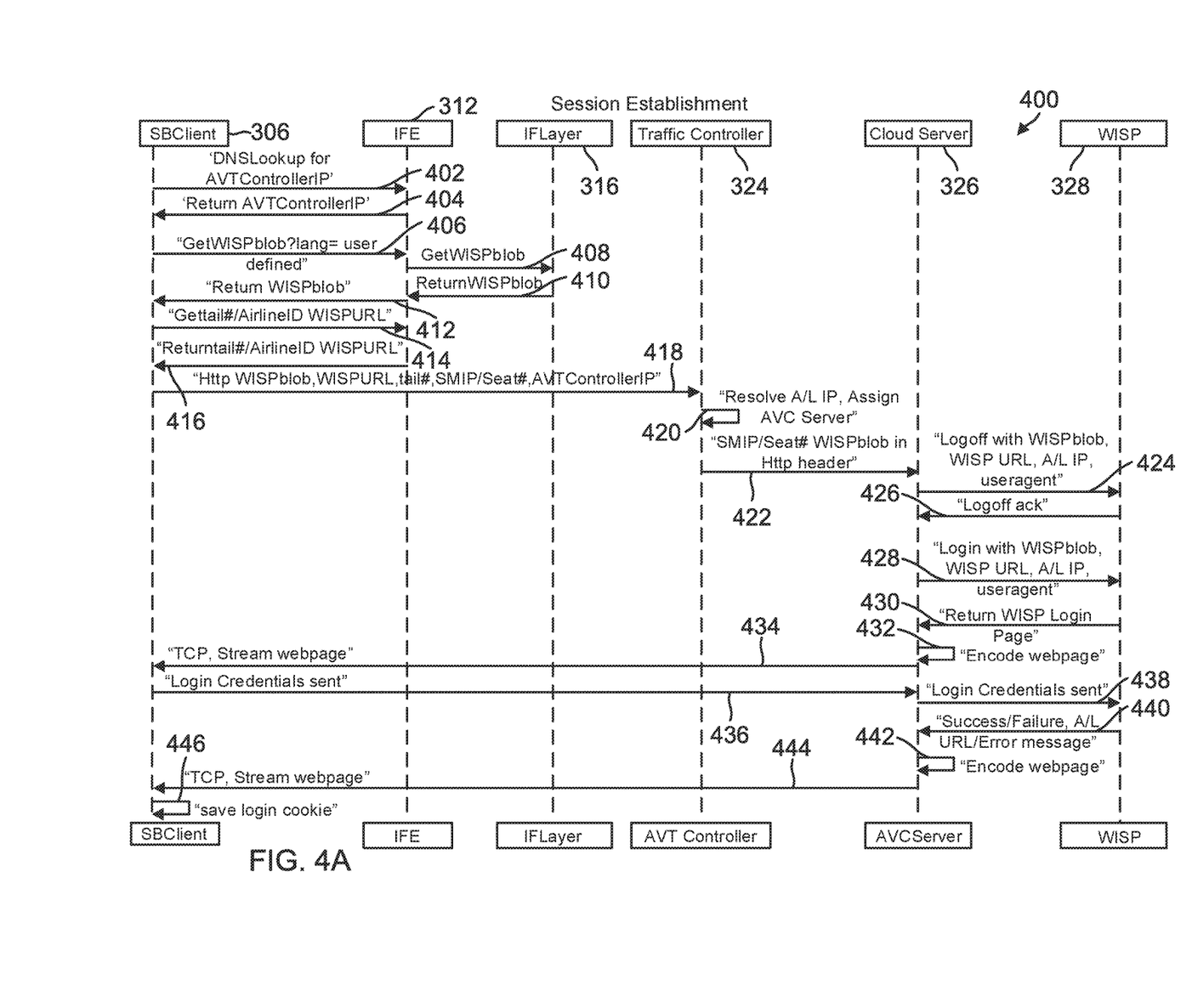
FIG. 4A shows a process flow for establishing a secured browsing session, according to one aspect of the present disclosure.

Process Flow:

FIG. 4A shows a process 400 for initiating a login session for seatback Internet access using remote browsing, according to one aspect of the present disclosure. The various components of system 300 are shown in FIG. 4A as software/hardware components that execute the various process blocks of process flow 400. The adaptive aspects however maybe implemented by using other components.

The process begins in block 402 after the seatback device 304 is initialized and is operational. The SBClient 306 initiates a domain name server (DNS) lookup for an AVT-Controller 324. The IFE 312 maintains this information in a data structure identifying the AVTController 324 and its associated IP address. The IFE layer 312 returns the IP address of the AVTController 324 to the SBClient 306 in process block 404.

In process block 406, the SBClient 306 issues a request to the IFE layer 312 for getting a WISP blob for the Internet session. The term WISP blob ties a request to an airline and aircraft tail number. The WISP blob is a signed airline specific data structure. As an example, a WISP blob may include the following fields:

"a"=>["tail_number"],
"b"=>["flight_number"],
"c"=>["departure_date"],
"d"=>["origin_iata"],
"e"=>["destination_iata"],
"f"=>["airline_prefix"],
"g"=>["departure_time"],
"h"=>["arrival_time"],
"i"=>["long_ip_address"],
"j"=>["mac_address"],
"k"=>["language_code"],
"l"=>["hash"]

The various adaptive aspects of the present disclosure are not limited to the specific foregoing fields or the WISP blob format provided above.

The IFE layer 312 forwards the WISP blob request to the IFLayer 316 in process block 408. The IFLayer 316 maintains the requested information in a data structure (not shown) and returns the WISP blob in process block 410. The IFE layer 312 provides the WISP blob to the SBClient 306 in process block 412.

In process block 414, the SBClient 306 requests the airline ID, aircraft tail number and a WISP URL from the IFE layer 312. The IFE layer 312 also maintains this information in a data structure and provides the same to the SBClient 306 in process block 416.

In process block 418, the SBClient 306 formats a request for the AVTController 324. The request may include the WISP blob, the WISP URL, the aircraft tail number, the seat number and seat IP address, the AVTController IP address or any other user defined information that may be needed for seatback Internet access. The request in process block 418 is sent to the AVTController 324 via gateway server 322.

In process block 420, the AVTController 324 determines a cloud server that can process the request. The AVTController 324 maintains a data structure with the IP addresses for the various AVCServers that may be used for different airlines.

In process block 422, the AVTController 324 sends the seat number, seatback device IP address and the WISP blob to the AVCServer 326 as part of an HTTP header.

In process block 424, the AVCServer 326 sends a request to the WISP server 328 to terminate any unaccounted sessions from the same seat. An acknowledgement is received from the WISP server 328 in process block 426. Thereafter, the AVCServer 326 sends a request to the WISP server 328 to start a new session in process block 428. The WISP server 328 returns a URL in process block 430. The AVCServer 326 encodes the webpage/URL in process block 432 and sends it to the SBClient 306 in process block 434. In response to that the SBClient 306 sends login credentials in process block 436 to the AVCServer 326. The AVCServer 326 then sends the login credentials to the WISP server 328 in process block 438.

The WISP server 328 verifies the credentials and if login is unsuccessful, an error message is sent in process block 440. The error message is encoded in block 442 and sent to the SBClient 306. If the login is successful, the requested webpage is also encoded in process block 442 and provided to the SBClient 306 in process block 444. The SBClient 306 saves any login cookies at a local memory in process block 446 for any future logins. Thereafter, the seatback device 304 is ready to access the Internet, described below with respect to FIG. 4B.

Figure 4B:
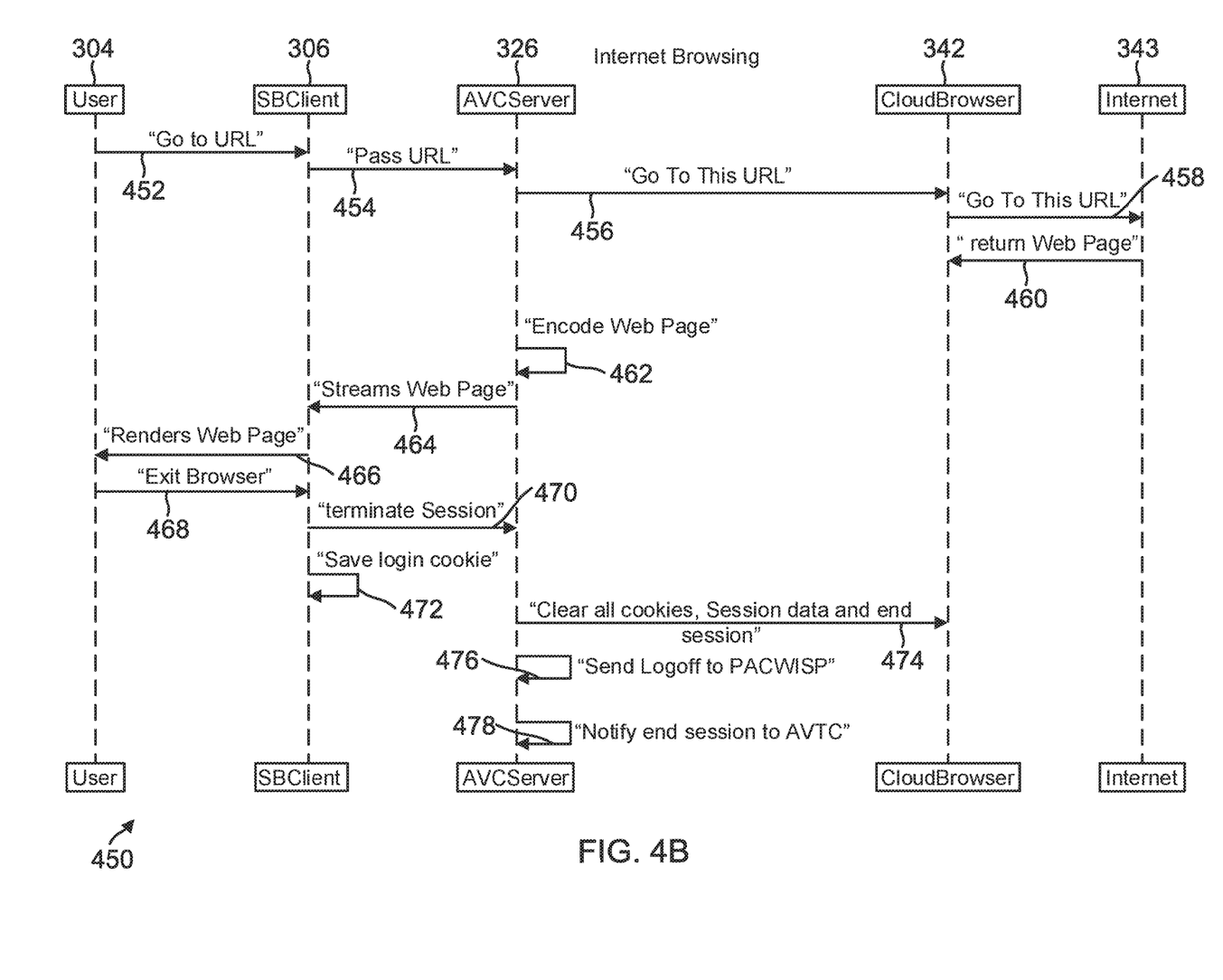
FIG. 4B show a process for remote browsing, according to one aspect of the present disclosure.

FIG. 4B shows a process 450 for remote Internet browsing, according to one aspect of the present disclosure. Process 450 is executed after a session has been initiated as described above with respect to FIG. 4A. The process begins in process block 452 when a URL is received by the SBClient 306 via an input device. The URL is passed to the AVCServer 326 in process block 454 and in process block 456, the URL is provided to the cloud browser 342. The cloud browser 342 sends a request for content in process block 458 and a web page is retrieved from the Internet 343 by the remote browser in process block 460. The AVCServer 326 encodes the webpage in process block 462. The encoded webpage is provided to the SBClient 306 in process block 464. The SBClient 306 then renders the webpage in process block 466 at a display device.

When the user 307 is done browsing, it sends a request to exit browsing in process block 468. The SBClient 306 then sends a terminate request to the AVCServer 326 in process block 470 after saving all the login cookies (472). The AVCServer 326 sends a request to the cloud browser 342 in process block 474 to clear all cookies, session data and end the session. In process block 476, the AVCServer 326 sends a logoff request to the WISP 328 and the AVTController 324 is notified of the termination in process block 478.

Figure 4C:
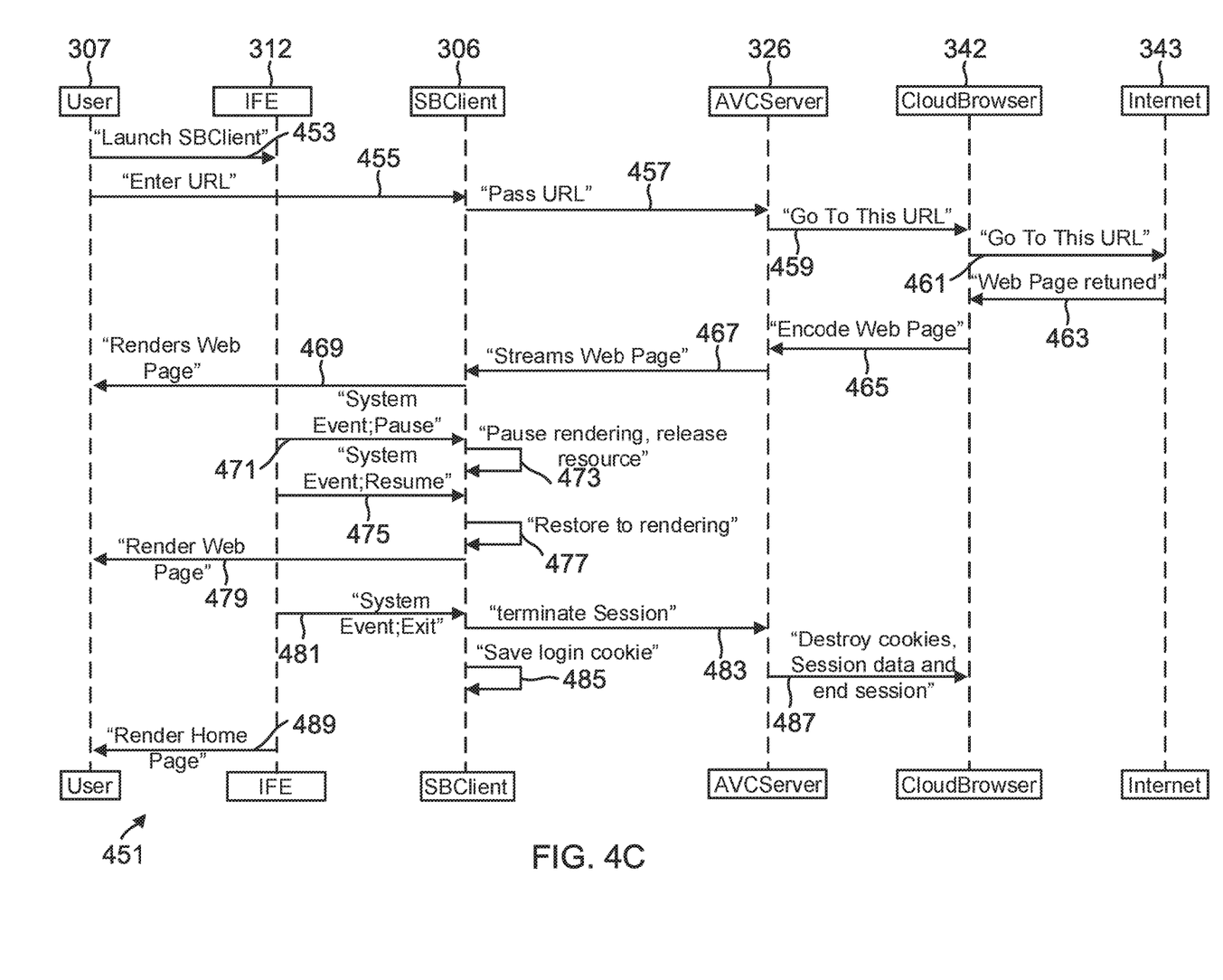
FIG. 4C shows a process for handling events at a transportation vehicle, according to one aspect of the present disclosure.

FIG. 4C shows a process 451 for handling special events at an aircraft, for example, pausing Internet access during a public announcement by a flight attendant, a pilot or anyone else, according to one aspect of the present disclosure. Process blocks 453, 455, 457, 459, 461, 463, 465, 467 and 469 are similar to the browsing process blocks of FIG. 4B and for brevity sake have not been repeated.

In block 471, the IFE layer 312 issues a Pause command in response to an event. The SBClient 306 pauses rendering and releases any resources associated with the rendering in process block 473. When a resume command is received by the SBClient 306 in process block 475, then the SBClient 306 restores rendering in process block 477. The image of the website is displayed in process block 479. Process blocks 481, 483, 485, 487 and 489 occur when a session is terminated and are self-explanatory.

Figure 4D:
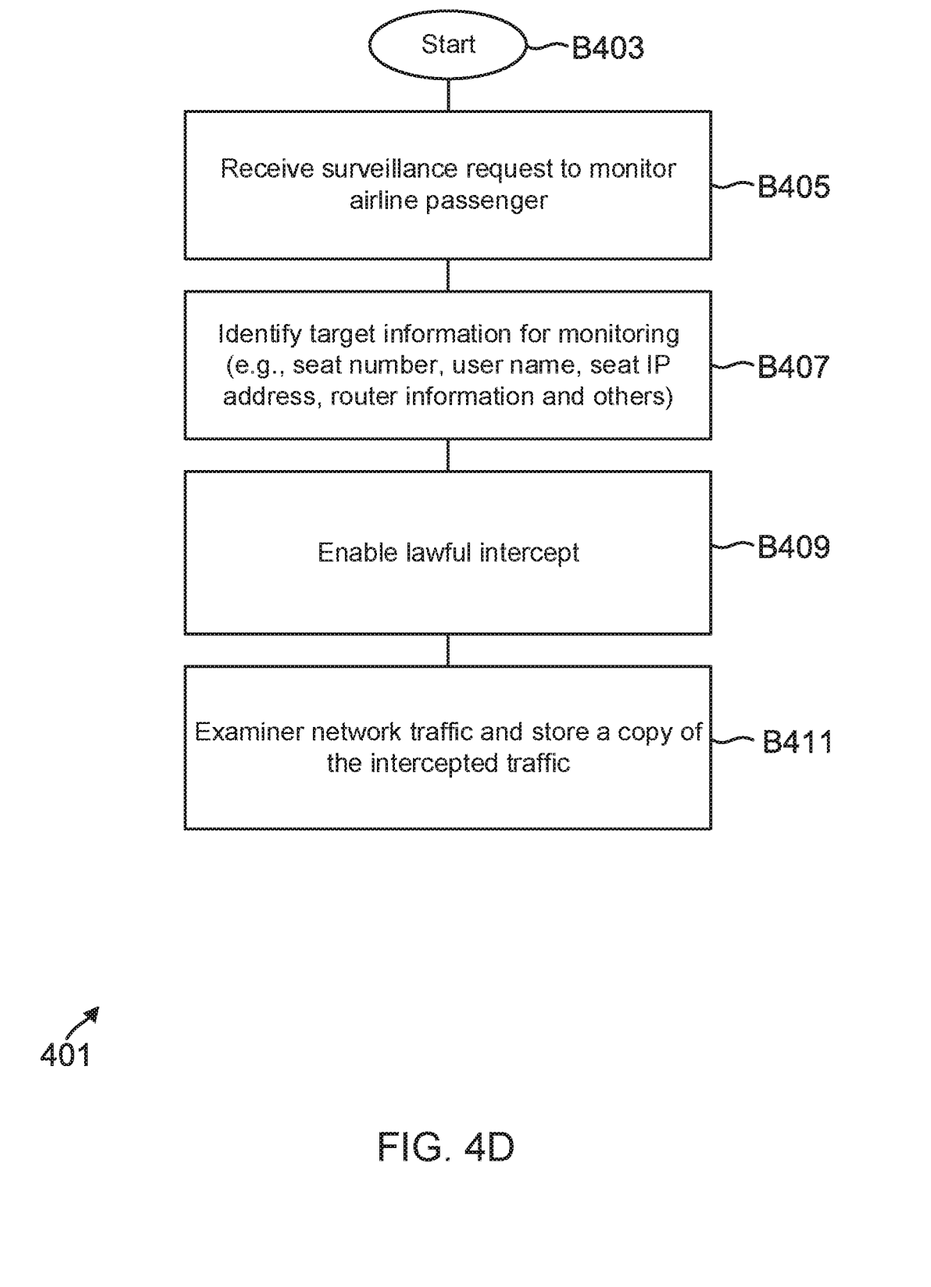
FIG. 4D shows a process flow for lawful intercept, according to one aspect of the present disclosure.

FIG. 4D shows a process 401 executed by computing devices of FIG. 3, according to one aspect of the present disclosure. Process 401 may start in process block 403 in response to a surveillance request from a lawful agency or other wise to monitor an airline passenger's browsing traffic. The process begins in process block 403 when the WISP server 328 enables lawful intercept for monitoring electronic traffic. In process block 405, a request to monitor a passenger may be received from the WISP server 328 and provided to the security server 340. In process block 407, the target is identified for monitoring based on the seat number, a target user name, the seatback device 304 IP address and a router/switch through which the Internet traffic passes through. This information is made available to the security server by the AVCServer 326. In one aspect, the security module 346 may maintain this information at a data structure.

In process block 409, the security module enables the lawful intercept. In process block 411, the security server examines network traffic of the passenger. The network traffic includes both incoming and outgoing traffic. A copy of the traffic may be stored at a storage device without disrupting the original traffic flow for the passenger.

In one aspect, the systems and processes disclosed herein provide a secured and efficient environment for a user from a seatback device. The remote browsing is secured so that a rogue passenger is not able to compromise the IFE system. Furthermore, because the remote browsing is outside the transportation vehicle (for example, a ground server), it is easier to update software compared to updating software at each seatback device. Furthermore, Internet traffic is efficiently monitored without impacting user experience or traffic.

Figure 5:
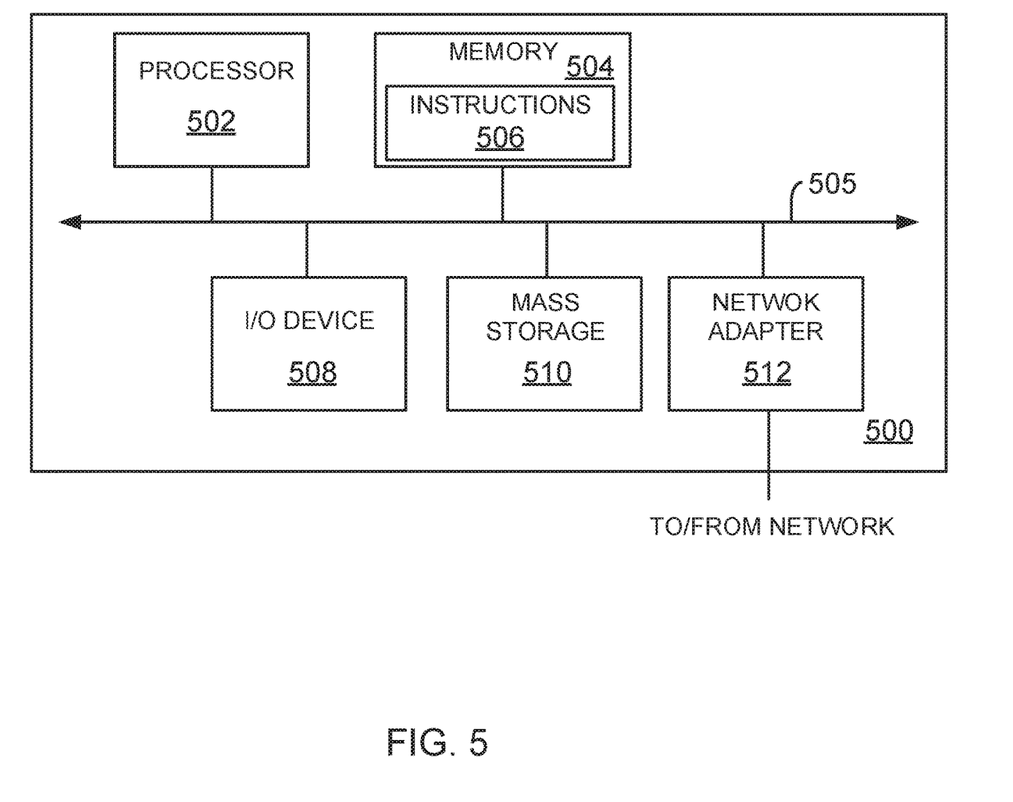
FIG. 5 shows an example of a hardware based, processing system, used according to one aspect of the present disclosure.

Processing System:

FIG. 5 is a high-level block diagram showing an example of the architecture of a processing system 500 that may be used according to one aspect. The processing system 500 can represent a seatback device 304, aircraft server 310, gateway server 322, AVTController 324, AVCServer 326, WISP server 328, content filter server 330 and security server 340, computing system 106, WAP 130 or any user device that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 4A-4D described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, a method and apparatus for remote browsing have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

generating a request for an Internet connection by a seat client executed by a processor of a seat device of a transportation vehicle, the request based on a signed data structure retrieved by the seat client, a transportation vehicle identifier identifying the transportation vehicle, an identifier for a controller remote to the transportation vehicle, and a seat device Internet address;

selecting a server by the controller for processing the request, based on the transportation vehicle identifier, the server being remote to the transportation vehicle;

terminating by the server any previous network session for the seat device;

transmitting an encoded link to the seat device by the server for authenticating the seat device; and receiving a validated encoded response from the seat device by the server to establish the Internet connection for a new session;

in response to a content request from the seat client, retrieving content for the seat device by a remote browser executed by the server;

transmitting an encoded image of the content to the seat device by the server; and rendering a decoded image by the seat client based on the encoded image received by the seat device, without using a browser at the seat device.

2. The method of claim 1, wherein upon initialization, the seat client obtains the identifier for the controller from an entertainment system and requests the signed data structure for the controller from the entertainment system.

3. The method of claim 1, wherein the transportation vehicle is an aircraft and the content is made available to the seat client via an in-flight entertainment system.

4. The method of claim 3, wherein an aircraft tail number, an airline identifier and a passenger seat number is provided to the controller for selecting the server.

5. The method of claim 3, wherein the server tracks bandwidth usage of the seat device for the new session and the remote browser executed by the server modifies a resolution of the encoded image based on the bandwidth usage.

6. The method of claim 3, wherein in response to an event, the seat client pauses content rendering at the seat device.

7. The method of claim 4, wherein the seat number and a network access address for the seat device are used for lawfully intercepting network traffic to and from the seat device.

8. A non-transitory machine readable storage medium having stored thereon instructions comprising machine executable code which when executed by at least one or more machines, causes the one or more machines to:

generate a request for an Internet connection by a seat client executed by a processor of a seat device of a transportation vehicle, the request based on a signed data structure retrieved by the seat client, a transportation vehicle identifier identifying the transportation vehicle, an identifier for a controller remote to the transportation vehicle, and a seat device Internet address;

select a server by the controller for processing the request, based on the transportation vehicle identifier, the server being remote to the transportation vehicle;

terminate by the server any previous network session for the seat device;

transmit an encoded link to the seat device by the server for authenticating the seat device;

receive a validated encoded response from the seat device by the server to establish the Internet connection for a new session;

in response to a content request from the seat client, retrieve content for the seat device by a remote browser executed by the server;

transmit an encoded image of the content to the seat device by the server; and render a decoded image by the seat client based on the encoded image received by the seat device, without using a browser at the seat device.

9. The non-transitory machine readable storage medium of claim 8, wherein upon initialization, the seat client obtains the identifier for the controller from an entertainment system and requests the signed data structure for the controller from the entertainment system.

10. The non-transitory machine readable storage medium of claim 9, wherein the transportation vehicle is an aircraft and the content is made available to the seat client via an in-flight entertainment system.

11. The non-transitory machine readable storage medium of claim 10, wherein an aircraft tail number, an airline identifier and a passenger seat number is provided to the controller for selecting the server.

12. The non-transitory machine readable storage medium of claim 10, wherein the server tracks bandwidth usage of the seat device for the new session and the remote browser executed by the server modifies a resolution of the encoded image based on the bandwidth usage.

13. The non-transitory machine readable storage medium of claim 10, wherein in response to an event, the seat client pauses content rendering at the seat device.

14. The non-transitory machine readable storage medium of claim 11, wherein the seat number and a network access address for the seat device are used for lawfully intercepting network traffic to and from the seat device.

15. A method, comprising:

receiving an identifier of a controller, remote to an aircraft by a seat client executed by a processor of a seat device of the aircraft;

retrieving a signed data structure by the seat client from an in-flight entertainment system based on the received identifier;

generating a request for an Internet connection by the seat client, the request includes the signed data structure, an aircraft identifier, the controller identifier, and a seat device network access address;

selecting a server by the controller for processing the request, based on the aircraft identifier, the server being remote to the transportation vehicle;

transmitting an encoded link to the seat device by the server for authenticating the seat device, upon termination of any previous network session;

establishing the Internet connection for a new session upon receiving a validated encoded response from the seat device by the server;

in response to a content request from the seat client, retrieving content for the seat device by a remote browser executed by the server;

transmitting an encoded image of the content to the seat device by the server;

rendering a decoded image by the seat client based on the encoded image received by the seat device, without using a browser at the seat device; and tracking bandwidth usage of the seat device for the new session by the server, wherein the remote browser modifies a resolution of the encoded image based on the bandwidth usage.

16. The method of claim 15, wherein upon initialization, the seat client requests the signed data structure for the controller from the in-flight entertainment system.

17. The method of claim 15, wherein in response to a public announcement, the seat client pauses content rendering at the seat device.

18. The method of claim 15, wherein a seat number included in the request and the seat device network access address are used for lawfully intercepting network traffic to and from the seat device.

19. The method of claim 18, wherein the controller provides the server with the seat number, the seat device network access address and the signed data structure as part of a network frame header.

20. The method of claim 15, wherein the request includes a uniform resource locator (URL) of a wireless service provider.

* * * * *